United States Patent
Ramachandran et al.

(10) Patent No.: US 9,684,316 B2
(45) Date of Patent: Jun. 20, 2017

(54) CONTROLLING CURRENT FOR POWER STEALING IN CLIMATE CONTROL SYSTEMS

(71) Applicant: Emerson Electric Co., St. Louis, MO (US)

(72) Inventors: Anil Ramachandran, Florissant, MO (US); Bradley C. Zikes, Sunset Hills, MO (US)

(73) Assignee: Emerson Electric Co., St. Louis, MO (US)

(*) Notice: Subject to any disclaimer, the term of this patent is extended or adjusted under 35 U.S.C. 154(b) by 647 days.

(21) Appl. No.: 13/857,467

(22) Filed: Apr. 5, 2013

(65) Prior Publication Data
US 2014/0299670 A1    Oct. 9, 2014

(51) Int. Cl.
*G05D 23/19*    (2006.01)
(52) U.S. Cl.
CPC .................... *G05D 23/19* (2013.01)
(58) Field of Classification Search
CPC ...................................... G05D 23/19
USPC ........................................ 307/125
See application file for complete search history.

(56) References Cited

U.S. PATENT DOCUMENTS

| | | | |
|---|---|---|---|
| 4,025,841 A * | 5/1977 | Chambers | G05F 1/573 323/268 |
| 4,776,514 A | 10/1988 | Johnstone et al. | |
| 5,192,874 A | 3/1993 | Adams | |
| 5,304,781 A | 4/1994 | Stalsberg | |
| 5,321,323 A | 6/1994 | Lehmann | |
| 5,635,896 A | 6/1997 | Tinsley et al. | |
| 5,736,795 A | 4/1998 | Zuehlke et al. | |
| 5,768,116 A | 6/1998 | Kompelien | |
| 5,903,139 A | 5/1999 | Kompelien | |
| 6,288,458 B1 * | 9/2001 | Berndt | H02M 3/07 307/126 |
| 6,315,211 B1 | 11/2001 | Sartain et al. | |
| 6,490,174 B1 * | 12/2002 | Kompelien | H02M 5/293 323/282 |
| 6,657,418 B2 | 12/2003 | Atherton | |
| 6,741,158 B2 | 5/2004 | Engler et al. | |
| 7,476,988 B2 | 1/2009 | Mulhouse et al. | |
| 7,642,674 B2 | 1/2010 | Mulhouse et al. | |

(Continued)

FOREIGN PATENT DOCUMENTS

| | | |
|---|---|---|
| CN | 101800425 A | 8/2010 |
| CN | 204030568 U | 12/2014 |
| GB | 2467590 B | 2/2013 |

OTHER PUBLICATIONS

Linear Technology LTC4085 Description and Characteristics: pp. 1-22.*

(Continued)

*Primary Examiner* — Jared Fureman
*Assistant Examiner* — Michael Warmflash
(74) *Attorney, Agent, or Firm* — Harness, Dickey & Pierce, P.L.C.

(57) ABSTRACT

A thermostat for use in a climate control system has a power stealing circuit that provides power from a voltage supply through a load of the climate control system when the load is in an "off" mode. The power stealing circuit has a current limiting circuit that provides a maximum level of instantaneous current predetermined to be a threshold beyond which the load is switched to an "on" mode.

20 Claims, 10 Drawing Sheets

(56) References Cited

U.S. PATENT DOCUMENTS

| | | | | |
|---|---|---|---|---|
| 7,755,220 | B2* | 7/2010 | Sorg | H02M 5/2576 |
| | | | | 307/125 |
| 8,110,945 | B2* | 2/2012 | Simard | H02M 5/2573 |
| | | | | 307/51 |
| 8,314,517 | B2 | 11/2012 | Simard et al. | |
| 8,523,083 | B2* | 9/2013 | Warren | F24F 11/0012 |
| | | | | 200/50.08 |
| 2011/0141770 | A1* | 6/2011 | Wilson | H02M 5/29 |
| | | | | 363/16 |
| 2012/0126019 | A1 | 5/2012 | Warren et al. | |
| 2012/0155137 | A1 | 6/2012 | Simard et al. | |
| 2012/0179300 | A1 | 7/2012 | Warren et al. | |
| 2012/0199660 | A1 | 8/2012 | Warren et al. | |
| 2012/0248210 | A1* | 10/2012 | Warren | F24F 11/0012 |
| | | | | 236/1 C |
| 2012/0256009 | A1 | 10/2012 | Mucignat et al. | |
| 2012/0261109 | A1* | 10/2012 | Warren | F24F 11/0012 |
| | | | | 165/201 |
| 2012/0267089 | A1 | 10/2012 | Mucignat et al. | |
| 2012/0325919 | A1* | 12/2012 | Warren | F24F 11/0012 |
| | | | | 236/1 C |

OTHER PUBLICATIONS http://www.journalgazette.net/article/20100816/BIZ0101/308169954; 2 pgs.

http://wiki.cytexone.com/download/attachments/16777246/Reducing+Power+Stealing+Side+Effects.pdf; 4 pgs.

http://pexsupply.blogspot.com/2011/11/power-stealing-thermostats.html; 3 pgs.

Texas Instruments, TPS60210, TPS60211, TPS60212, TPS60213 Regulated 3.3V, Low-Ripple Charge Pump with Ultralow Operating Current; Jun. 2000; 22 pgs.

http://www.onsemi.com/PowerSolutions/product.do?id=NSI50010YT1G; 1 pg.

http://www.onsemi.com/PowerSolutions/product.do?id=NSI45015W; 1 pg.

Chinese Office action issued in Chinese Patent of Invention Application No. 201410136588.3, dated Jun. 1, 2016, which claims priority to the instant application; 7 pgs.

* cited by examiner

CONTROLLING CURRENT FOR POWER STEALING IN CLIMATE CONTROL SYSTEMS

FIELD

The present disclosure relates to current control for power stealing.

BACKGROUND

This section provides background information related to the present disclosure which is not necessarily prior art.

Digital thermostats in climate control systems typically have microcomputers and other components that continuously use electrical power. Various digital thermostats utilize "off-mode" power stealing to obtain operating power. That is, when a given load (e.g., compressor, fan, or gas valve) in a climate control system is off, power may be stolen from the given load circuit to power the thermostat.

SUMMARY

This section provides a general summary of the disclosure, and is not a comprehensive disclosure of its full scope or all of its features.

Exemplary embodiments or implementations are disclosed of methods, apparatus, and systems for controlling current for power stealing. An exemplary embodiment is directed to a thermostat for use in a climate control system. The thermostat has a power stealing circuit configured to provide power from a voltage supply through a load of the climate control system when the load is in an "off" mode. The power stealing circuit has a current limiting circuit configured to provide a maximum level of instantaneous current predetermined to be a threshold beyond which the load is switched to an "on" mode.

Another exemplary embodiment is directed to a power stealing circuit for obtaining power from a voltage source through a control system load that is in an "off" mode. The power stealing circuit includes a current limiting circuit configured to provide a maximum level of instantaneous current predetermined not to cause the load to be switched to an "on" mode. The maximum level of instantaneous current corresponds to a maximum voltage threshold at which the load is not switched to the "on" mode.

An exemplary implementation is directed to a method of providing power stealing in a climate control system to provide power through a load that is in an "off" mode to one or more ancillary circuits of the system. The method includes determining a maximum value of instantaneous current for providing the power that would not cause the load to be switched to an "on" mode, and using the maximum value to limit current through the load in the "off" mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
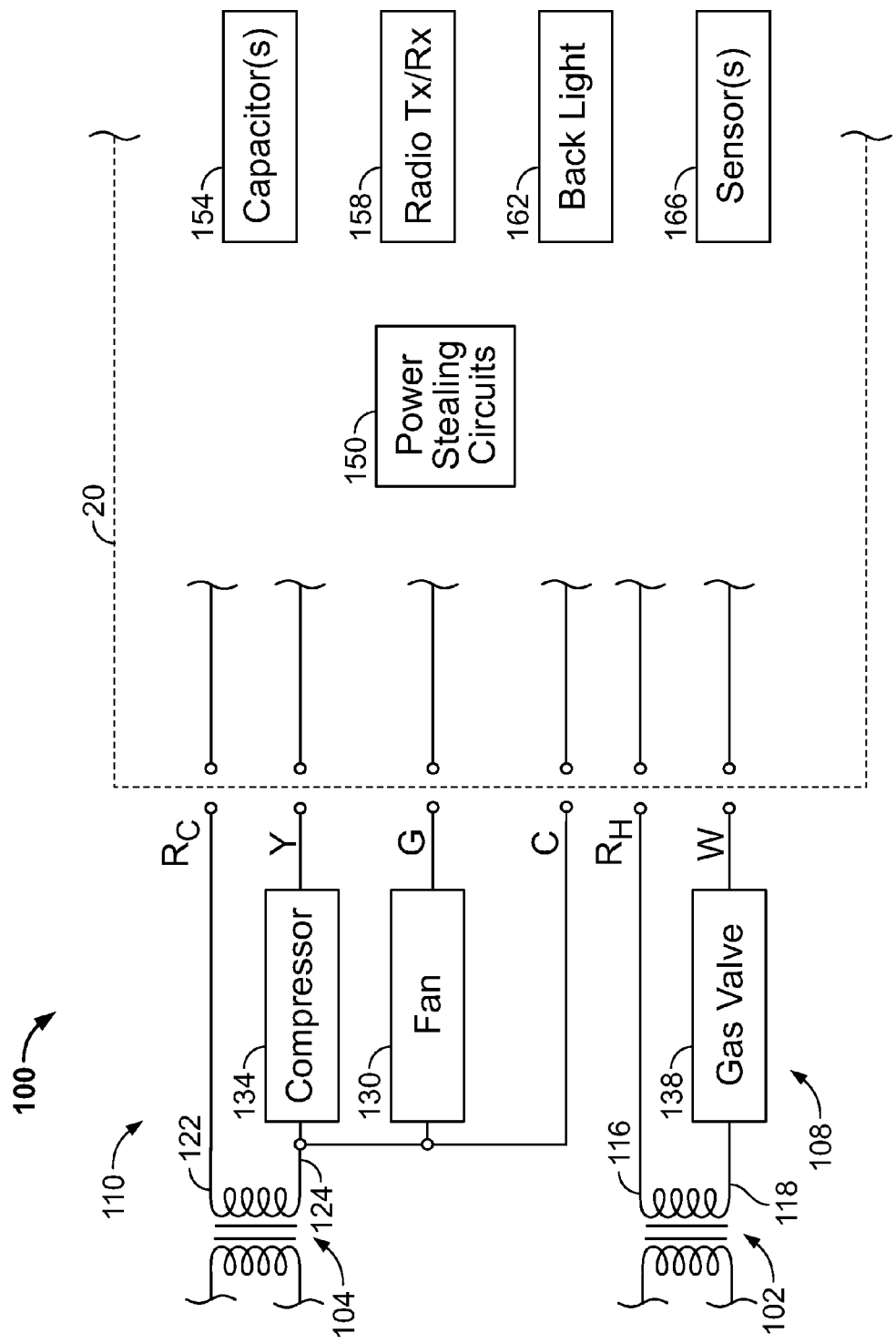
FIG. 1 is a diagram of an exemplary climate control system including a thermostat in accordance with an exemplary embodiment of the present disclosure.

One example embodiment of a digital thermostat is indicated generally in FIG. 1 by reference number 20. The thermostat 20 is used in a climate control system indicated generally by reference number 100. The climate control system 100 includes two power sources, e.g., two transformers 102 and 104 for providing power respectively to a heating subsystem 108 and a cooling subsystem 110. The heating subsystem transformer 102 has a hot (typically 24-volt) side 116 and a common, i.e., neutral, side 118. The cooling subsystem transformer 104 has a hot (typically 24-volt) side 122 and a common, i.e., neutral, side 124. The cooling subsystem 110 includes a fan 130 and a compressor 134 connected on the common side 124 of the transformer 104. The heating subsystem 108 includes a furnace gas valve 138 connected on the common side 118 of the heating subsystem transformer 102. A C terminal also is provided from a common C wire connected, e.g., with the common side 124 of the transformer 104.

It should be noted generally that thermostat embodiments in accordance with various aspects of the disclosure could be installed in other types of climate control systems, including systems having a single transformer, heat-only systems, cool-only systems, etc. In some embodiments a C terminal may be provided, e.g., from the common side 118 of the transformer 102. In some other embodiments, a thermostat might not be provided with a connection to a common C wire.

The thermostat 20 may activate one or more relays and/or other switching devices(s) (not shown in FIG. 1) to activate the heating subsystem 108 or cooling subsystem 110. When, e.g., a user operates the thermostat 20 to cause the climate control system 100 to provide heating, the thermostat 20 turns on the heating subsystem 108 and gas valve 138 by using a relay or other switching device to connect a "hot" terminal $R_H$ to a load terminal W. To provide cooling, the thermostat 20 may turn on the compressor 134 and/or fan 130 by using one or more relays or other switching device(s) to connect a "hot" terminal $R_C$ to load terminals Y and/or G.

In one example embodiment of the disclosure, and as further described below, the thermostat 20 utilizes "off-mode" power stealing. When, e.g., cooling is being provided, a power stealing circuit 150 may obtain power from the heating subsystem transformer 102 for the thermostat 20. When, e.g., heating is being provided, the power stealing circuit 150 may obtain power from the cooling subsystem transformer 104 for the thermostat 20. Power may be used for powering components of the thermostat 20. Power also may be stored in one or more capacitors 154 and/or may be used, e.g., to power one or more circuits ancillary to the thermostat 20, including but not limited to a radio transceiver 158, a back light 162, and/or one or more sensors 166. In various embodiments, power from a battery (not shown) may be provided in the event, e.g., that power stealing is inoperable.

In providing power stealing through a (liven off-mode load, it is highly desirable to prevent a potential across the off-mode load from causing the off-mode load to be unintentionally turned on. Where, e.g., the transformers 102 and 104 are Class 2, 24 VAC transformers, transformer output may vary, e.g., from 18 VAC to 30 VAC depending on the transformer's load. Generally, thermostats that provide off-mode power stealing have been designed so that, e.g., an instantaneous voltage across a load connected at an R terminal when a transformer is outputting 30 VAC does not go over a specific threshold that would cause the load to turn on.

The inventors have observed that such systems typically include a current limiting resistor so that, e.g., for pairs of specified off-mode load impedances and turn-on voltage thresholds, at a 30 VAC transformer output on an R connection, an instantaneous voltage does not exceed the turn-on voltage threshold. Although a typical current limiting resistor may be large enough to prevent load turn-on at the highest predefined turn-on voltage threshold, the inventors have observed that the large resistance also limits current (and therefore power) to the thermostat.

Thus, in various aspects of the inventors' disclosure, a power stealing circuit is provided that does not include a limiting resistor for limiting instantaneous voltage across an off-mode load to predefined threshold levels as described above. In various embodiments, a current limiting circuit provides a maximum level of instantaneous current predetermined to be a threshold beyond which the load is switched to an "on" mode. In one example embodiment, a thermostat is provided for use in a climate control system. A power stealing circuit of the thermostat includes a current limiting circuit configured to provide a maximum amount of power (i.e., current voltage) to be harvested through an off-mode load of a climate control system. Such power may be used, for example, to energize a capacitor to power a radio transceiver. In various embodiments, the current limiting circuit adjusts for variations in supply voltage and load.

Figure 2:
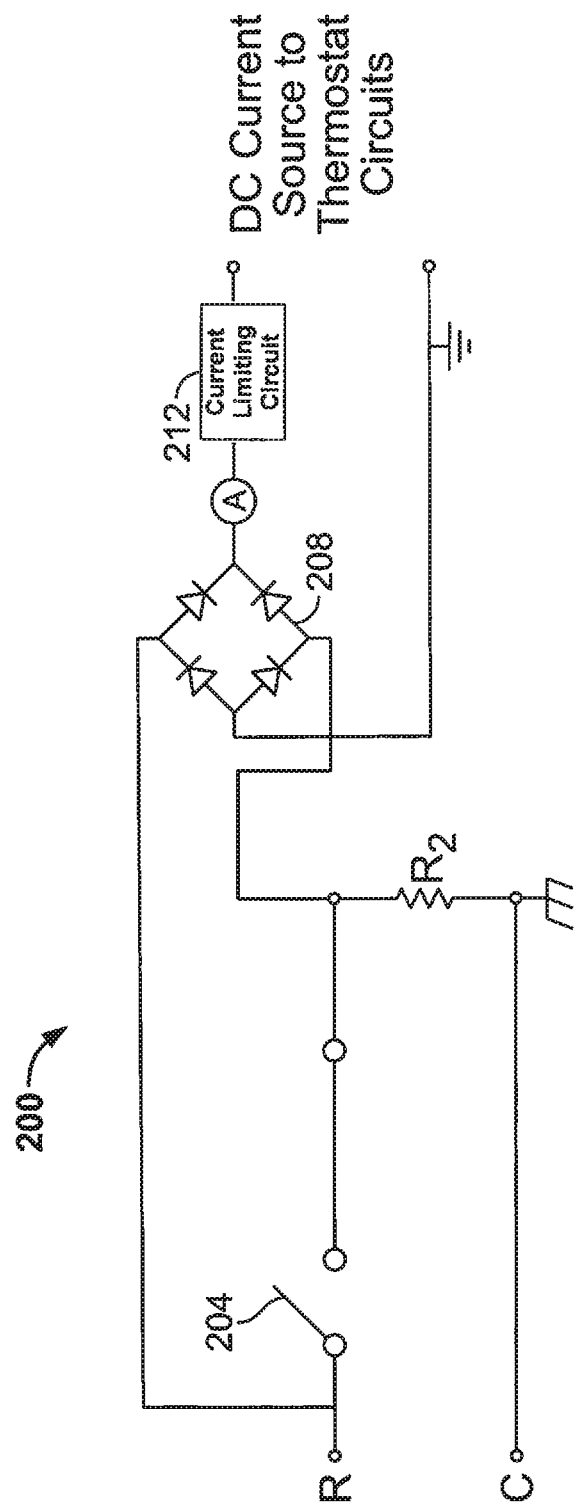
FIG. 2 is a diagram of an exemplary power stealing circuit in accordance with an exemplary embodiment of the present disclosure.

One example embodiment of a power stealing circuit is indicated generally in FIG. 2 by reference number 200. The circuit 200 is connected across an R terminal (e.g., a terminal $R_C$ or $R_H$ as discussed with reference to FIG. 1) and a common C terminal (e.g., a C terminal as discussed with reference to FIG. 1.) A 24 VAC voltage may be provided across the R and C terminals. A resistor $R_2$ represents a load, e.g., a gas valve, compressor, or fan, through which power stealing is performed. When a switch 204 is open, the load $R_2$ is in an "off" mode. When the switch 204 is closed, the load $R_2$ is switched into an "on" mode.

A rectifier 208, e.g., a full bridge rectifier, rectifies the 24 VAC signal. In some alternative embodiments, a half-wave rectifier may be used. A current limiting circuit 212 is connected with an output terminal A of the rectifier 208. The current limiting circuit 212 is configured to provide a DC current, e.g., to a thermostat and/or other circuit(s) such as a radio transceiver, a back light, one or more sensors, etc. Additionally or alternatively, DC current may be input, e.g., to one or more capacitors to provide power to the thermostat 20 and/or other circuit(s). In various embodiments, the current limiting circuit 212 is configured to provide a maximum level of instantaneous current predetermined not to cause the off-mode load to be switched to an "on" mode. The maximum level of instantaneous current can be predetermined without regard to off-mode load resistance, which may vary.

In one embodiment, a maximum level of instantaneous current may be predetermined for a power stealing circuit as described below. For the sake of comparison, an example of conventional power stealing circuit design shall be described first. An example thermostat may be designed to work with different controls that have example values as shown in Table 1 for input impedance and threshold voltage on a specific input terminal, above which the input would be treated as "on" by the controls. If a current limiting resistor were to be used in series with a 24 VAC supply, the current limiting resistor values required to keep appropriate voltage across the load in each case could be calculated as shown in Table 1.

TABLE 1

| HVAC Load Resistance (Ohm) | Threshold Turn ON Voltage (V) | Current Limiting Resistor Value (Ohms) to Keep V Across HVAC Load to Below Threshold at 30 VAC |
|---|---|---|
| 100 | 8 | 425.00 |
| 200 | 10 | 640.00 |
| 500 | 12 | 1250.00 |
| 1000 | 15 | 1800.00 |
| 2000 | 15 | 3600.00 |

If all diode drops in rectification were to be ignored, and the thermostat's digital circuits were to be treated as a zero-ohm load for a worst case, and signal rectification were to be considered as resulting in the same voltage as AC peak voltage across the current limiting resistor and the load resistor combined, values for the current limiting resistor would be obtained as shown in Table 1, out of which the highest value would be used to configure a power stealing circuit. Thus, a 3600Ω current limiting resistor would need to be included in a power stealing circuit to ensure that the thermostat works with all of the different controls without unintentionally turning "on" the input.

Where, e.g., a 3600-ohm resistor is used, data may be obtained, e.g., as shown in Table 2.

TABLE 2

| HVAC Load Resistance (Ohm) | Threshold Turn ON Voltage (V) | Current Limiting Resistor Value Used (Ohms) | RMS AC Current at 18 VAC (A) | Max Voltage Across Load at 18 VAC (V) |
|---|---|---|---|---|
| 100 | 8 | 3600.00 | 0.004865 | 0.675676 |
| 200 | 10 | 3600.00 | 0.004737 | 1.315789 |
| 500 | 12 | 3600.00 | 0.00439 | 3.04878 |
| 1000 | 15 | 3600.00 | 0.003913 | 5.434782 |
| 2000 | 15 | 3600.00 | 0.003214 | 8.928571 |

It can be seen that at 18 VAC, less than 9V instantaneous voltage would be put across an HVAC load. Additionally, even within an AC waveform, there would be times when more current could be obtained by reducing the effective value of the current limiting resistance.

In contrast to the foregoing data, data may be determined in various embodiments of the disclosure, e.g., as shown in Table 3.

TABLE 3

| HVAC Load Resistance (Ohm) | Threshold Turn ON Voltage (V) | Max Instantaneous Current (A) |
|---|---|---|
| 100 | 8 | 0.08 |
| 200 | 10 | 0.05 |
| 500 | 12 | 0.024 |
| 1000 | 15 | 0.015 |
| 2000 | 15 | 0.0075 |

Instead of using a resistor selected for a worst case to limit voltage across a load, in various embodiments of the disclosure a maximum instantaneous current may be determined that could go through the load without switching the load "on." As shown in Table 3, for example, the lowest value of maximum instantaneous current, i.e., 7.5 mA, may be used in an embodiment of a current limiting circuit for a thermostat designed to work with the different controls.

Figure 3:
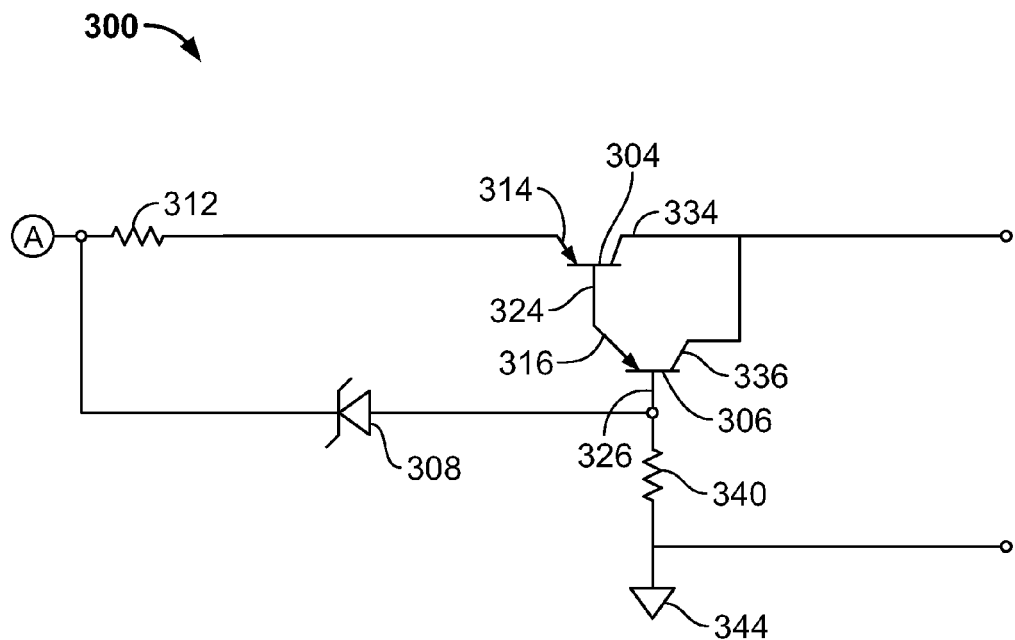
FIGS. 3 and 4 are diagrams of exemplary current limiting circuits in accordance with exemplary embodiments of the present disclosure.

One example embodiment of a current limiting circuit is indicated generally in FIG. 3 by reference number 300. The current limiting circuit 300 is configured to limit instantaneous current from a rectifier output terminal A (e.g., as discussed with reference to FIG. 2) to a predetermined maximum level. The circuit 300 receives a rectified signal from a power stealing circuit rectifier (e.g. the rectifier 208 of FIG. 2). PNP bipolar junction transistors (BJTs) 304 and 306 are connected with a Zener diode 308 and a resistor 312. The Zener diode 308 has a 50 mA knee and a voltage of 5.6 volts. The Zener diode 308 may be, e.g., a Vishay MMSZ 4690 Zener diode. The transistor 304 has an emitter 314, a base 324, and a collector 334. The transistor 306 has an emitter 316, a base 326, and a collector 336. The base 324 of the transistor 304 is connected with the emitter 316 of the transistor 306. The transistors 304 and 306 have connected collectors 334 and 336. Another resistor 340 is provided between the transistor 306, the Zener diode 308, and signal ground 344. Continuing the foregoing example, where a maximum instantaneous current of 7.5 mA is to be obtained from the circuit 300, a resistance value for the resistor 312 may be determined as follows. Applying Kirchhoff's voltage law (KVL):

$$V_Z = 2V_{EB} + V_R$$
$$I = (V_Z - 2V_{EB})/R$$
$$= 7.5 \text{ mA},$$

where $V_Z$ represents Zener voltage (5.6V), $V_{EB}$ represents transmitter emitter-base voltage (0.68V), R represents resistance of the resistor 312 and $V_R$ represents a voltage drop across the resistor 312. Thus in the present example, resistance of the resistor 312 is determined to be 565.33Ω.

In another example embodiment, the resistor 312 may have a value of between 300Ω and 330Ω, and the resistor 340 may have a value of 220 kΩ. Where the resistor 312 has a minimum value of 300Ω, a maximum instantaneous current of 14.1 mA is produced.

Figure 4:
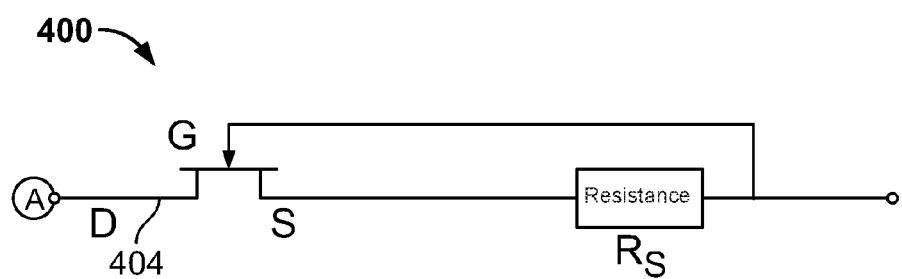

Another example embodiment of a current limiting circuit is indicated generally in FIG. 4 by reference number 400. The circuit 400 receives a rectified signal from a power stealing circuit rectifier (e.g., the rectifier 208 of FIG. 2). The circuit 400 includes an n-channel field effect transistor (FET) 404 configured with a fixed resistance $R_S$ to form a constant current diode circuit. Feedback from a signal leaving the resistance $R_S$ is provided at the gate G of the FET 404.

Figure 5:
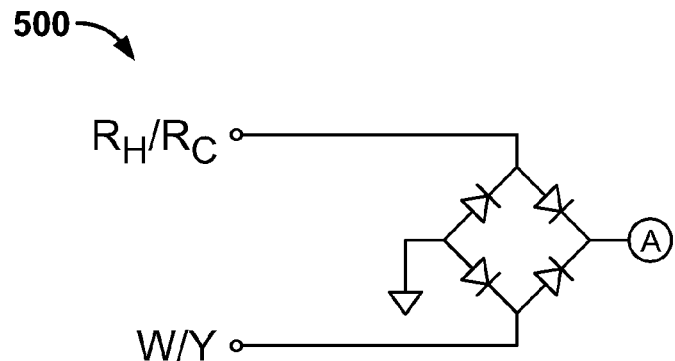
FIGS. 5 and 6 are diagrams of exemplary rectifier circuits in accordance with exemplary embodiments of the present disclosure.

One example embodiment of a full bridge rectifier of a power stealing circuit is indicated generally in FIG. 5 by reference number 500. The rectifier 500 rectifies an input signal for input to a current limiting circuit (not shown in FIG. 5). Referring to FIG. 1, the rectifier 500 may be selectively connected between the $R_H$ and W terminals, or between the $R_C$ and Y terminals. The example embodiment 500 may be used, e.g., where no C wire connection is available to the thermostat.

Figure 6:
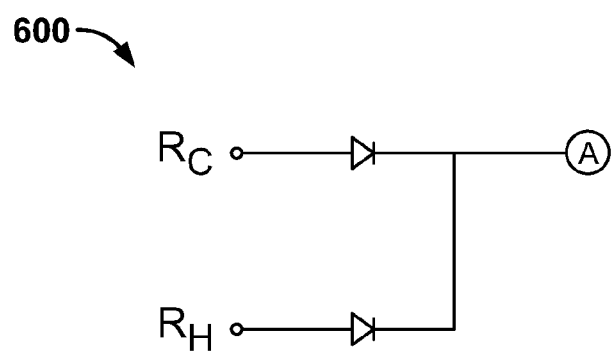

Another example rectifier embodiment is indicated generally in FIG. 6 by reference number 600. The rectifier 600 rectifies an input signal for input to a current limiting circuit (not shown in FIG. 6). Half-wave rectification may be selectively performed on input from the $R_C$ terminal or from the $R_H$ terminal before being input to a current limiting circuit.

Figure 7:
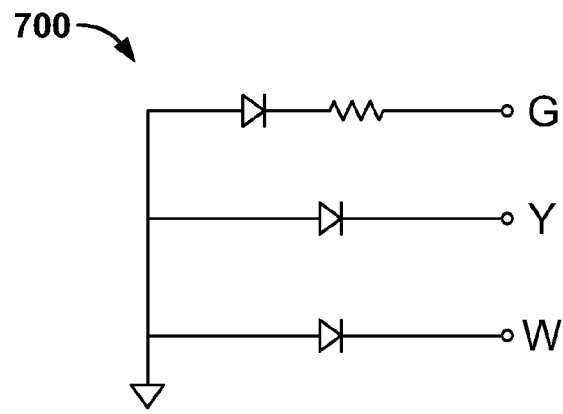
FIG. 7 is a diagram of an exemplary switching circuit in accordance with an exemplary embodiment of the present disclosure.
Figure 8A:
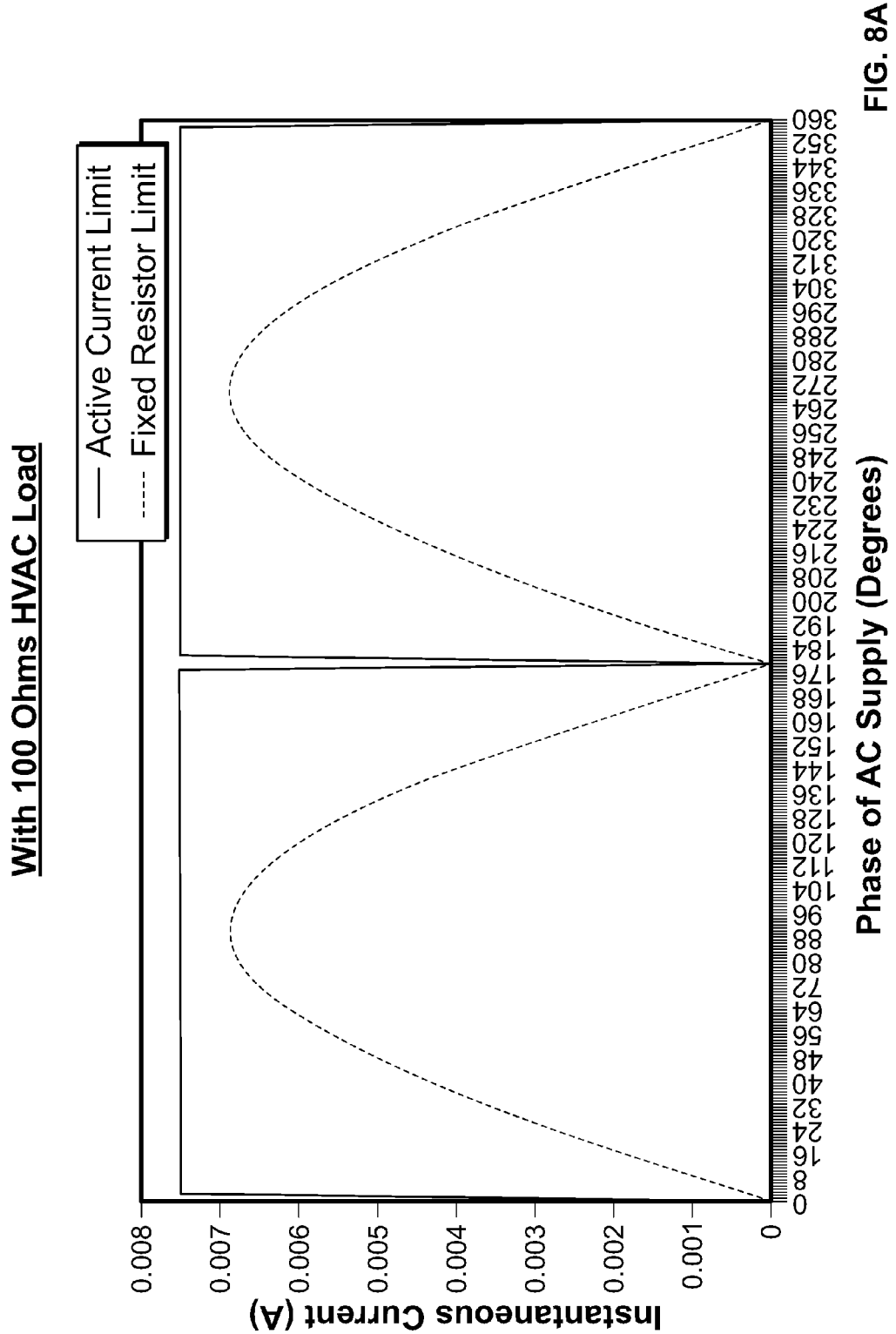
FIGS. 8A-8E are graphs in which instantaneous current provided using a current limiting resistor is compared to instantaneous current provided using a current limiting circuit in accordance with an exemplary embodiment of the present disclosure.
Figure 8B:
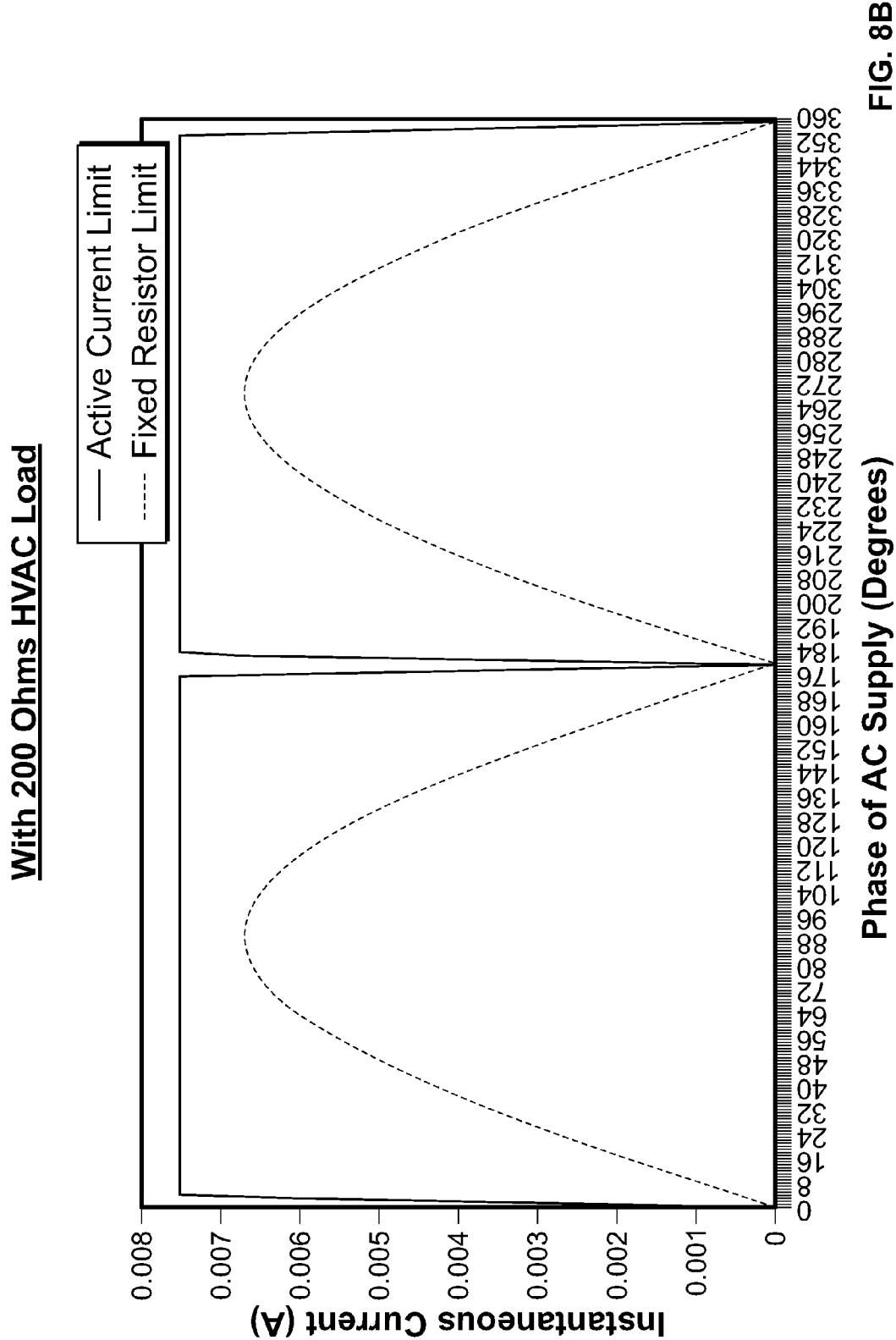
Figure 8C:
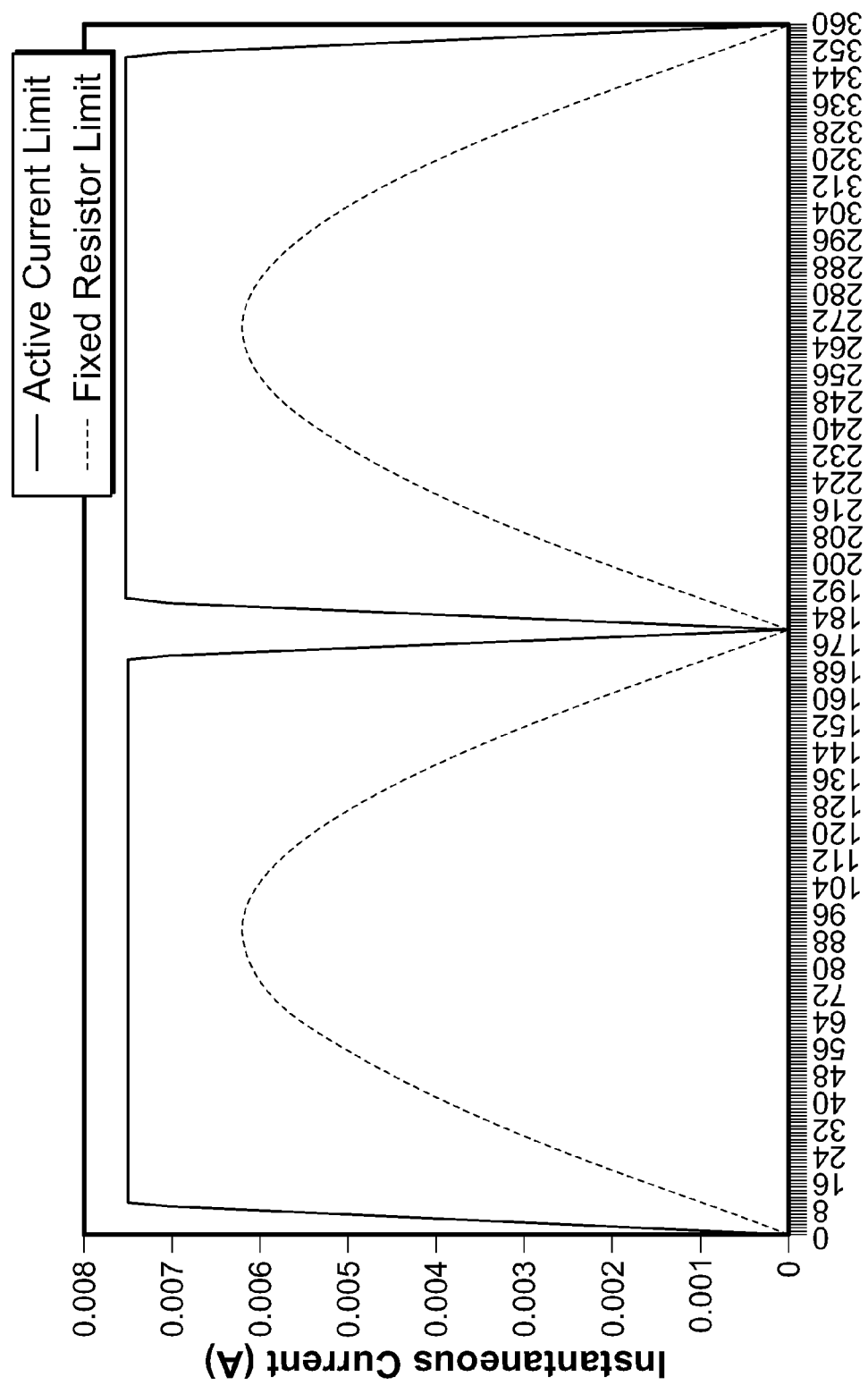
Figure 8D:
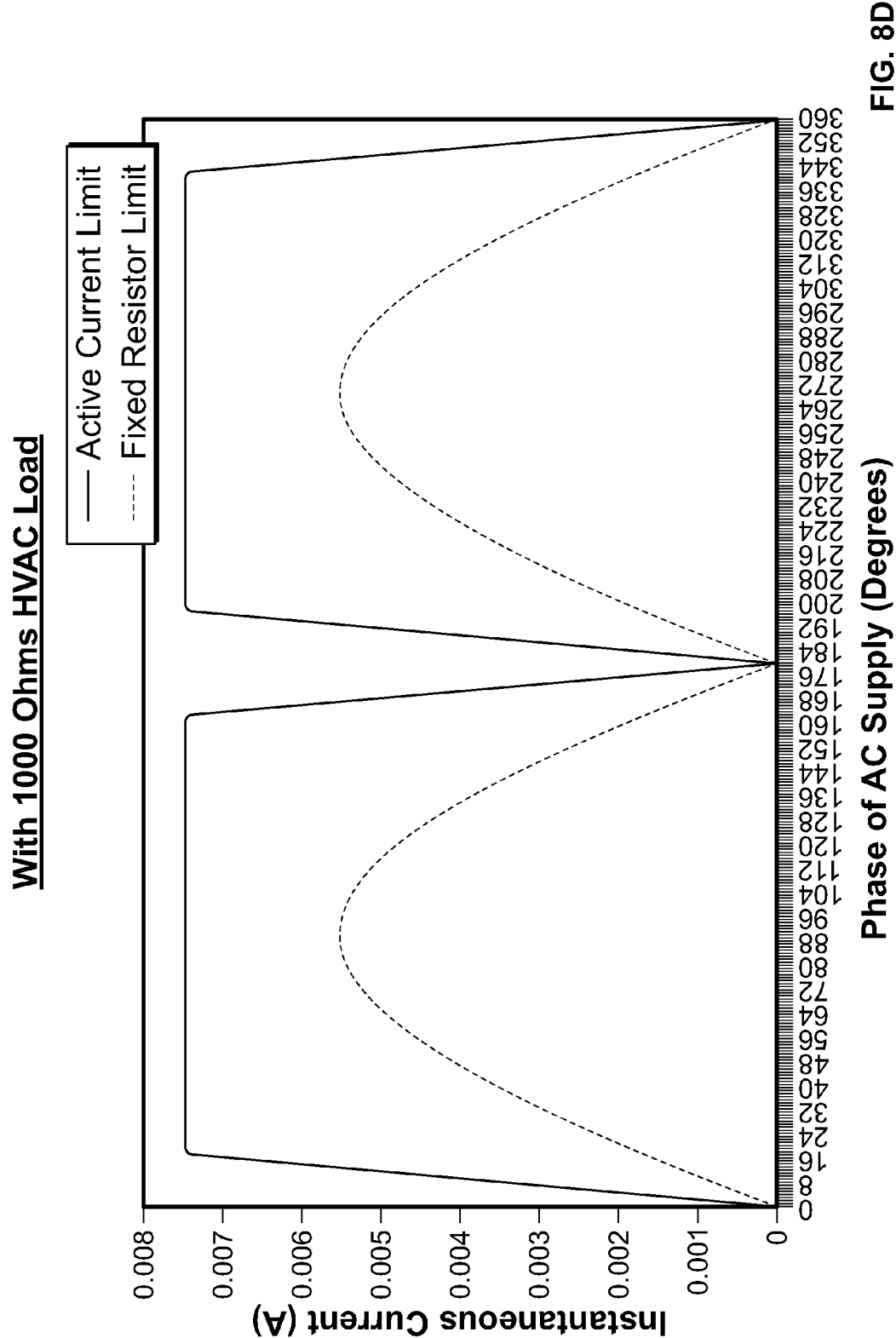
Figure 8E:
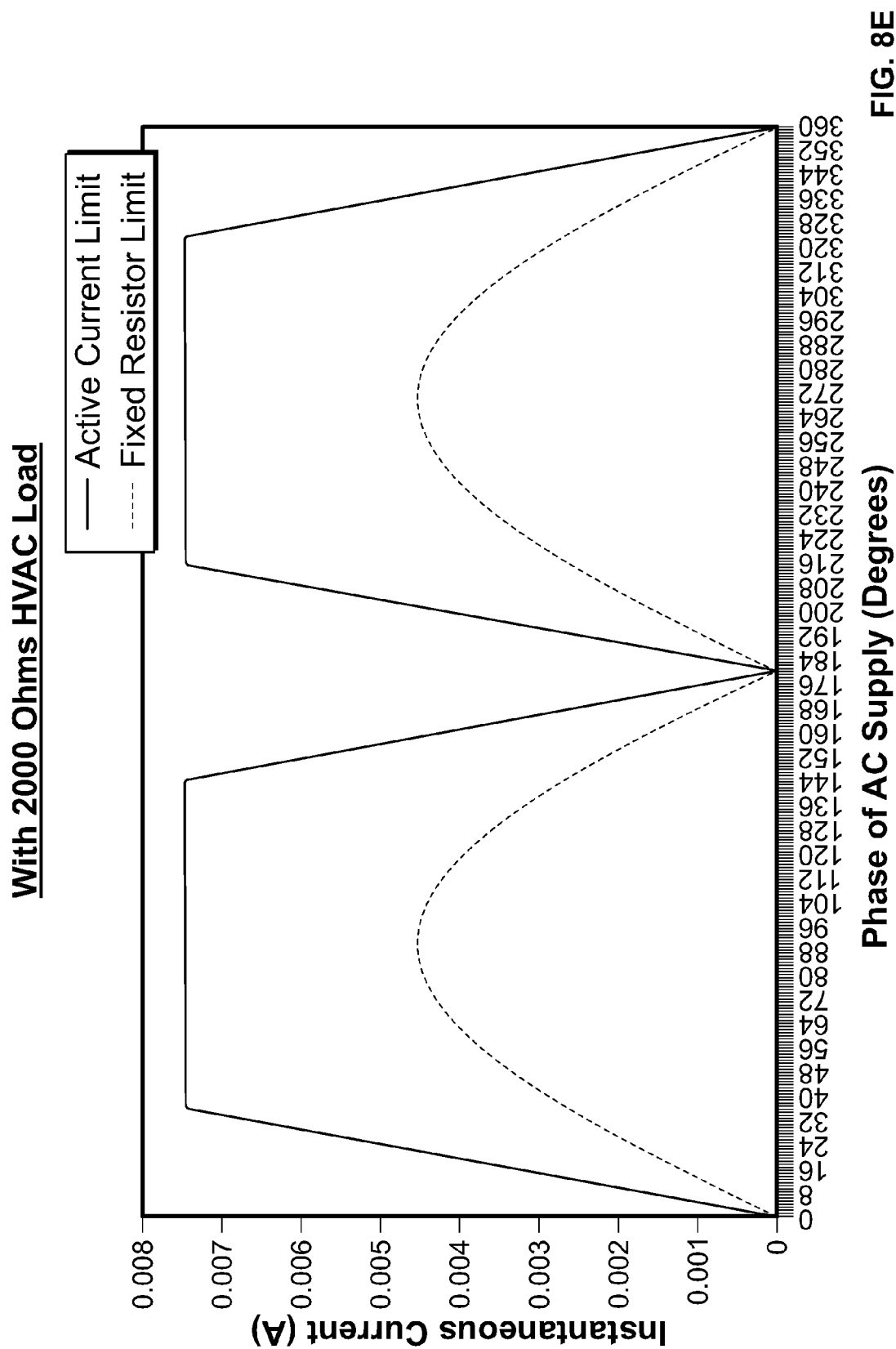

An example switching embodiment is indicated generally in FIG. 7 by reference number 700. One or more of the G, Y and/or W terminals, e.g., as shown in FIG. 1, may be selected for input to a power stealing circuit so that power may be stolen through more than one climate control system component, e.g., through a fan, compressor, and/or gas valve.

Continuing the above example comparison, where it is assumed that a 3600-ohm resistor would be replaced by a 7.5 mA current limiting circuit, maximum instantaneous current available across an ideal bridge rectifier for supplying power to a thermostat would be as shown in FIGS. 8A-8E. In FIGS. 8A-8E, dashed lines represent instantaneous current values for a circuit in which a 3600-ohm resistor is used. Solid lines represent instantaneous current values for a circuit in which maximum instantaneous current is limited to 7.5 mA. Example improvements in RMS current are shown in Table 4.

TABLE 4

| HVAC Load Resistance (Ohm) | Threshold Turn ON Voltage | Max RMS AC Current (A) at 18 VAC With 3600 Ohm Current Limiting Resistor | Max RMS AC Current (A) at 18 VAC With 7.5 mA Current Limiting Circuit | Percentage Improvement in Max RMS AC Current |
|---|---|---|---|---|
| 100 | 8 | 0.004864865 | 0.007441321 | 53% |
| 200 | 10 | 0.004736842 | 0.007393945 | 56% |
| 500 | 12 | 0.004390244 | 0.007250281 | 65% |
| 1000 | 15 | 0.003913043 | 0.007000889 | 79% |
| 2000 | 15 | 0.003214286 | 0.006442746 | 100% |

It can be seen that using an example embodiment of a current limiting circuit would improve a worst-case RMS AC current from 3.21 mA to 6.44 mA, a twofold improvement. Further, in the present example the worst-case improvement is the most pronounced improvement. Thus it can be possible, e.g., for a thermostat design to provide current availability twice as large as that of systems in which current limiting resistors are used. Compared to systems using current limiting resistors, various embodiments of the foregoing power stealing and current limiting circuits make it possible for higher current to be drawn by a power stealing circuit for substantially all load scenarios.

Figure 9A:
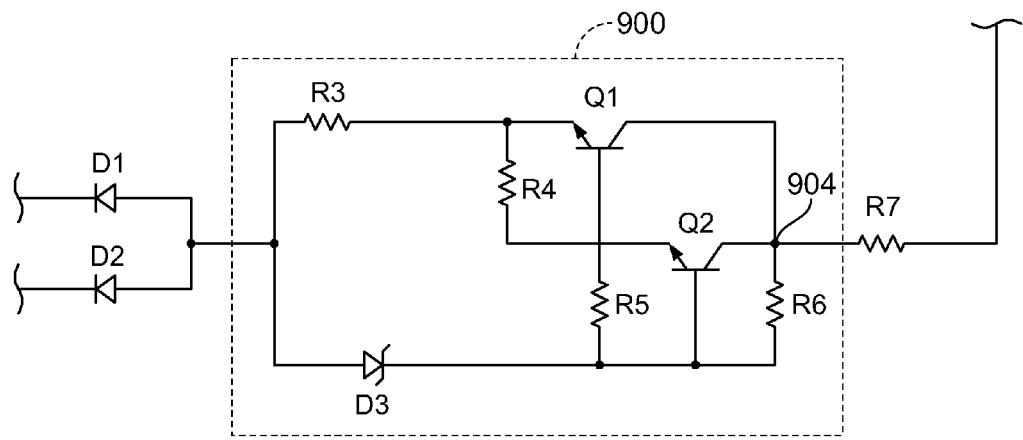
FIGS. 9A and 9B are diagrams of exemplary current limiting circuits in accordance with exemplary embodiments of the present disclosure.

Another example embodiment of a current limiting circuit is indicated in FIG. 9A by reference number 900. The circuit 900 includes NPN transistors Q1 and Q2, the collectors of which are joined at a node 904. The circuit 900 is configured to provide an adjustable maximum current of about 14 mA. This current maximum may be adjusted by adjusting resistance in the circuit 900. Example components and example component values for the circuit 900 are as follows:

R3—60.4Ω
R4—10 kΩ
R5—100 kΩ
R6—100 kΩ
D3—Zener diode, MMSZ4678, available from ON Semiconductor®
Q1, Q2—NPN transistors, NSS60201LT1G, available from ON Semiconductor®

Values of other power stealing circuit components shown in FIG. 9A may be as follows:

D1, D2—S1G diodes
R7—0Ω

Figure 9B:
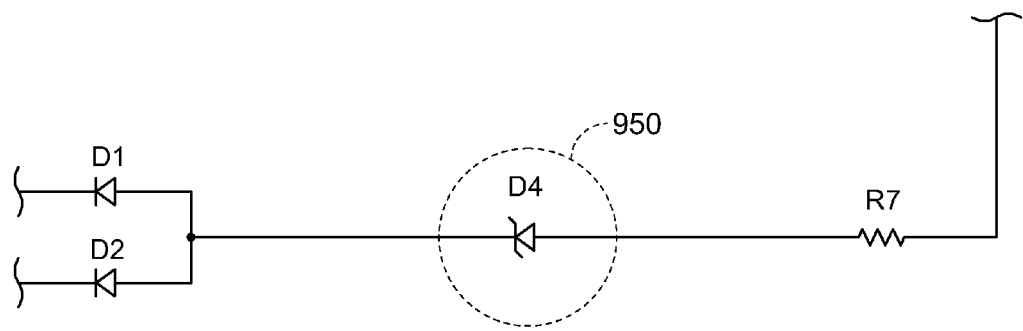

Another example embodiment of a current limiting circuit is indicated in FIG. 9B by reference number 950. The circuit 950 includes a constant current regulator (CCR) D4 configured, e.g., to provide a maximum current of about 10 mA. The CCR D4 may be, e.g., a NSI50010YT1G CCR available from ON Semiconductor®. In some other embodiments, a CCR may be used that provides a maximum current of about 15 mA. Such a CCR may be, e.g., a NSI45015W CCR available from ON Semiconductor®. Values of other power stealing circuit components shown in FIG. 9B may be as follows:

D1, D2—S1G diodes
R7—0Ω

Although various embodiments of the disclosure are described with reference to thermostats, other or additional configurations are possible in relation to devices, controllers, controls, and control systems other than thermostats. Power stealing could be implemented, e.g., in relation to a device that has access to two or more load circuits, such that at a given time one of the circuits would not be carrying a load and would be available from which to steal power in accordance with aspects of the present disclosure. Further, other or additional current limiting circuits, rectification circuits, and/or switching circuits may be provided in various embodiments.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermostat operable to control a given function of a climate control system by switching a corresponding load of the climate control system between "on" and "off" modes, the thermostat comprising:
a power stealing circuit configured to provide power from a voltage supply through a given load of the climate control system when the load is in an "off" mode;
the power stealing circuit having a current limiting circuit configured based on a plurality of predetermined instantaneous current values corresponding to a plurality of climate control system functions, including the given function, controllable by the thermostat, where each value is predetermined to be a maximum instantaneous current through an off-mode load of the corresponding climate control system function and above which the off-mode load would be switched to an "on" mode;
the current limiting circuit configured to limit instantaneous current received by the current limiting circuit to a fixed instantaneous current level predetermined, based on the predetermined instantaneous current values, to be a fixed maximum instantaneous current threshold at which each of the off-mode loads would not be switched to an "on" mode;
the power stealing circuit configured by the current limiting circuit to selectively provide the power through any of the plurality of off-mode loads.

2. The thermostat of claim 1, wherein the fixed maximum instantaneous current corresponds to a maximum voltage threshold at which the load is not switched to the "on" mode.

3. The thermostat of claim 1, wherein the power stealing circuit is configured to provide power to one or more circuits ancillary to the thermostat.

4. The thermostat of claim 3, wherein the one or more ancillary circuits comprise one or more of the following: a radio transceiver, a backlight, and a sensor.

5. The thermostat of claim 1, wherein the current limiting circuit comprises a Zener diode connected with a pair of transistors having connected collectors.

6. The thermostat of claim 1, wherein the current limiting circuit comprises a constant current diode or a constant current regulator.

7. The thermostat of claim 1, wherein the maximum instantaneous current is predetermined without regard to resistance of the load and/or is provided without having to discharge a battery, if any.

8. A power stealing circuit for obtaining power from a voltage source through a given control system load that is in an "off" mode, the given load corresponding to a given function of the control system, the power stealing circuit comprising:
a current limiting circuit configured based on a plurality of predetermined instantaneous current values corresponding to a plurality of functions, including the given function, of the control system, where each value is predetermined to be a maximum instantaneous current through an off-mode load of the corresponding control system function, above which the off-mode load would be switched to an "on" mode;
the current limiting circuit configured to limit instantaneous current received by the current limiting circuit to a fixed instantaneous current level predetermined, based on the predetermined instantaneous current level values, to be a fixed maximum level of instantaneous current at which each of the off-mode loads would not be switched to an "on" mode, the maximum level of instantaneous current corresponding to a maximum voltage threshold at which the load is not switched to the "on" mode;
the power stealing circuit configured by the current limiting circuit to steal power through any of the control system loads that is in the "off" mode and selectable for power stealing therefrom.

9. The power stealing circuit of claim 8, wherein the maximum level of instantaneous current is predetermined without regard to resistance of the load.

10. A thermostat comprising the power stealing circuit of claim 8.

11. The power stealing circuit of claim 8, wherein the power stealing circuit is configured to provide power to a thermostat, and the control system functions include one or more of the following: heating, cooling, and blowing.

12. The power stealing circuit of claim 11, wherein the power stealing circuit is configured to provide power to one or more circuits ancillary to the thermostat.

13. The power stealing circuit of claim 12, wherein the one or more ancillary circuits comprise one or more of the following: a radio transceiver, a backlight, and a sensor.

14. The power stealing circuit of claim 8, wherein the current limiting circuit comprises a Zener diode connected with a pair of transistors having connected collectors.

15. The power stealing circuit of claim 8, wherein the current limiting circuit comprises a constant current diode or a constant current regulator.

16. A method of providing power stealing in a climate control system to provide power from a voltage supply through a load that is in an "off" mode to one or more ancillary circuits of the system, the method comprising:
determining a plurality of instantaneous current values corresponding to a plurality of climate control system functions, where each value is a maximum instantaneous current through an off-mode load of a corresponding climate control system function and above which the off-mode load would be switched from an "off" mode to an "on" mode for performing the corresponding function;
based on the determined instantaneous current values, determining a fixed maximum value of instantaneous current for providing the power, the fixed maximum value being a maximum instantaneous current threshold at which each of the off-mode loads corresponding to the plurality of climate control system functions would not be switched to an "on" mode; and using the fixed maximum value to limit current through one or more of the loads when in the "off" mode;

the using performed by providing, in a power stealing circuit of the climate control system, a current limiting circuit that outputs instantaneous current at the fixed maximum value to provide the power.

17. The method of claim 16, further comprising inputting the current to one or more capacitors of the climate control system.

18. The method of claim 16, wherein the maximum value of instantaneous current is determined relative to a maximum voltage turn-on threshold.

19. The method of claim 16, wherein the one or more ancillary circuits include a thermostat.

20. The method of claim 16, further comprising determining the maximum level of instantaneous current without regard to resistance of the load.

* * * * *